US012538076B2

(12) United States Patent
Matsunami et al.

(10) Patent No.: US 12,538,076 B2
(45) Date of Patent: Jan. 27, 2026

(54) SOUND DEVICE AND CONTROL METHOD

(71) Applicant: DENSO TEN Limited, Hyogo (JP)

(72) Inventors: Yutaka Matsunami, Kobe (JP); Junji Amaya, Kobe (JP); Toshio Nakamichi, Kobe (JP)

(73) Assignee: DENSO TEN Limited, Kobe (JP)

( * ) Notice: Subject to any disclaimer, the term of this patent is extended or adjusted under 35 U.S.C. 154(b) by 238 days.

(21) Appl. No.: 18/188,655

(22) Filed: Mar. 23, 2023

(65) Prior Publication Data

US 2024/0098419 A1 Mar. 21, 2024

(30) Foreign Application Priority Data

Sep. 16, 2022 (JP) ................................. 2022-147573
Mar. 13, 2023 (JP) ................................. 2023-039037

(51) Int. Cl.
*H04R 5/04* (2006.01)
*B60N 2/01* (2006.01)
*H04R 1/02* (2006.01)
*H04R 5/02* (2006.01)
*H04S 1/00* (2006.01)
*H04S 3/00* (2006.01)

(52) U.S. Cl.
CPC ................. *H04R 5/04* (2013.01); *B60N 2/01* (2013.01); *H04R 1/025* (2013.01); *H04R 5/02* (2013.01); *H04S 1/007* (2013.01); *H04S 3/008* (2013.01); *H04R 2201/025* (2013.01); *H04R 2499/13* (2013.01); *H04R 2499/15* (2013.01); *H04S 2400/01* (2013.01)

(58) Field of Classification Search
None
See application file for complete search history.

(56) References Cited

U.S. PATENT DOCUMENTS 7,509,192 B2 * 3/2009 Fukuro ................ H03K 19/177 296/37.16
2021/0237660 A1 * 8/2021 Iwase .................. B60R 11/0217
2022/0238094 A1 * 7/2022 Wang ..................... H04R 1/025
2023/0254643 A1 * 8/2023 Guo ....................... H04N 5/642 381/99

FOREIGN PATENT DOCUMENTS

JP 2018-093468 A 6/2018
JP WO-2022138128 A1 * 6/2022 ............... H04R 5/02

OTHER PUBLICATIONS

WO2022138128—Display Apparatus, Jun. 30, 2022, pp. 22, Inventor Ikuma, Yoshinori (Year: 2022).*

* cited by examiner

*Primary Examiner* — Duc Nguyen
*Assistant Examiner* — Assad Mohammed
(74) *Attorney, Agent, or Firm* — Oliff PLC

(57) ABSTRACT

A sound device for controlling a panel speaker configured to output sound by vibrating a single panel with a plurality of vibration actuators, the sound device includes a controller configured to select a stereo mode in which each of the plurality of vibration actuators is vibrated by a sound signal of each channel included in a content, and a monaural mode in which the plurality of vibration actuators are vibrated by a same sound signal.

12 Claims, 5 Drawing Sheets

SOUND DEVICE AND CONTROL METHOD

CROSS-REFERENCE TO RELATED APPLICATIONS

This application is based on and claims priorities under 35 USC 119 from Japanese Patent Application No. 2022-147573 filed on Sep. 16, 2022 and Japanese Patent Application No. 2023-039037 filed on Mar. 13, 2023, the contents of which are incorporated herein by reference.

TECHNICAL FIELD

The present invention relates to a sound device and a control method.

BACKGROUND ART

In a vehicle such as a passenger vehicle, a display to be viewed by an occupant may be installed. The display may include a panel speaker that outputs a sound by vibrating a display screen (display panel). The panel speaker may have a stereo play function in which sounds of plural channels.

CITATION LIST

Patent Literature

Patent Literature 1: JP2018-093468A

SUMMARY OF INVENTION

When a display installed in a vehicle includes a panel speaker having a stereo play function, an occupant on a seat in a vicinity of the panel speaker can hear sound from the panel speaker at a sufficient volume. However, it may be difficult for an occupant on a seat away from the panel speaker to hear the sound from the panel speaker due to an effect of road noise or the like. For example, when the panel speaker is installed on a dashboard in the front of the vehicle (in front of a front-row (first-row) seat), the seats away from the panel speaker are rear-row seats (seats in second and subsequent rows). At this time, the seat in the vicinity of the panel speaker is the front-row (first-row) seat. The front-row (first-row) seat is a driver seat or a passenger seat. Further, for example, in a vehicle having three or more rows of seats, a panel speaker for occupants on the seats in the second and subsequent rows is installed in a vicinity of (in front of) a second-row seat 12. Seats away from the panel speaker are seats in third and subsequent rows. At this time, seats in the vicinity of the panel speaker are seats in the second row.

An object of an embodiment of the disclosure is to enable sound from a panel speaker mounted on a vehicle to be easily heard.

In order to solve the above-described problems, the following means are adopted.

That is, the first aspect of the disclosure relates to a sound device for controlling a panel speaker configured to output sound by vibrating a single panel with a plurality of vibration actuators. The sound device includes a controller configured to select a stereo mode in which each of the plurality of vibration actuators is vibrated by a sound signal of each channel included in a content, and a monaural mode in which the plurality of vibration actuators are vibrated by a same sound signal.

An aspect of the disclosure may be implemented by causing an information processing device to execute a program. That is, a configuration of the disclosure can be specified as a program for causing the information processing device to execute processes executed by respective means in the above-described aspect, or as a recording medium, storing the program, that can be read by an information processing device. Further, the configuration of the disclosure may be specified as a method by which the information processing device executes the processes executed by the respective means. The configuration of the disclosure may be specified as a system including the information processing device that performs the processes executed by the respective means. The information processing device is, for example, a computer. The computer may be called a personal computer or a server.

In the embodiment of the disclosure, it may be possible to easily hear the sound from the panel speaker mounted on the vehicle.

BRIEF DESCRIPTION OF DRAWINGS

Exemplary embodiment(s) of the present invention will be described in detailed based on the following figures, wherein.

DESCRIPTION OF EMBODIMENTS

Hereinafter, embodiments will be described with reference to the drawings. A configuration of the embodiments is illustrative, and the configuration of the invention is not limited to a specific configuration of the embodiments of the disclosure. In accordance with the embodiments of the invention, the specific configuration according to the embodiments may be adopted as appropriate.

Embodiments (Configuration Example)

Figure 1:
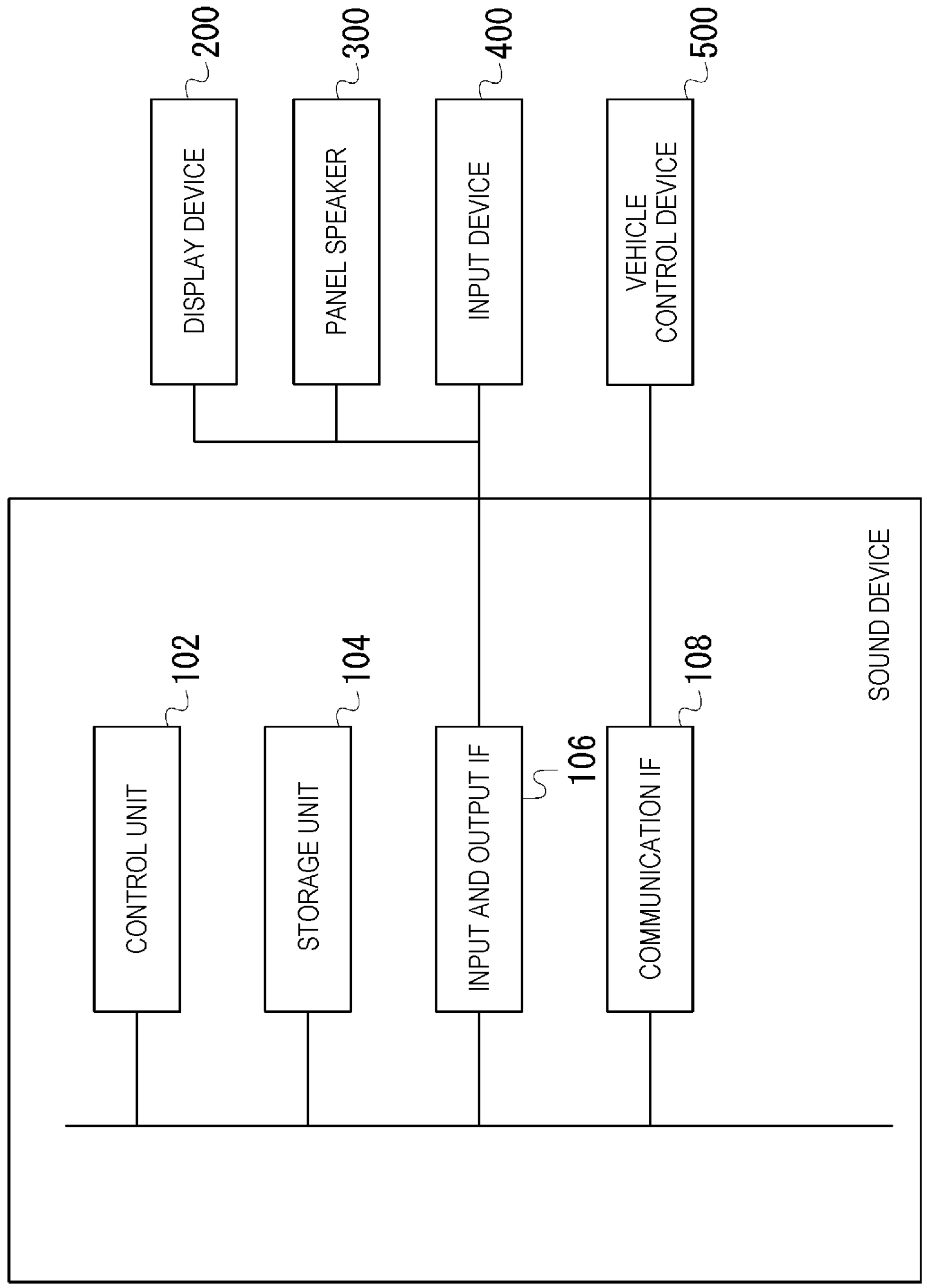
FIG. 1 is a diagram illustrating a configuration example of a system including a sound device according to an embodiment.

FIG. 1 is a diagram illustrating a configuration example of a system including a sound device according to the present embodiment. The system of FIG. 1 includes a sound device 100, a display device 200, a panel speaker 300, an input device 400, and a vehicle control device 500. The panel speaker 300 outputs sound by vibrating a display screen of the display device 200. The display device 200, the panel speaker 300, and the input device 400 may be integrated into an input and output device. The system of FIG. 1 is mounted on a vehicle such as a passenger vehicle having three or more rows of seats. The sound device 100 includes a control unit 102, a storage unit 104, an input and output interface (IF) 106, and a communication interface (IF) 108. These are connected to each other via a bus. The sound device 100 may be implemented by, for example, a car navigation device equipped with a computer, and a personal computer. A vehicle having three or more rows of seats is an example of a vehicle having a plurality of rows of seats.

Figure 2:
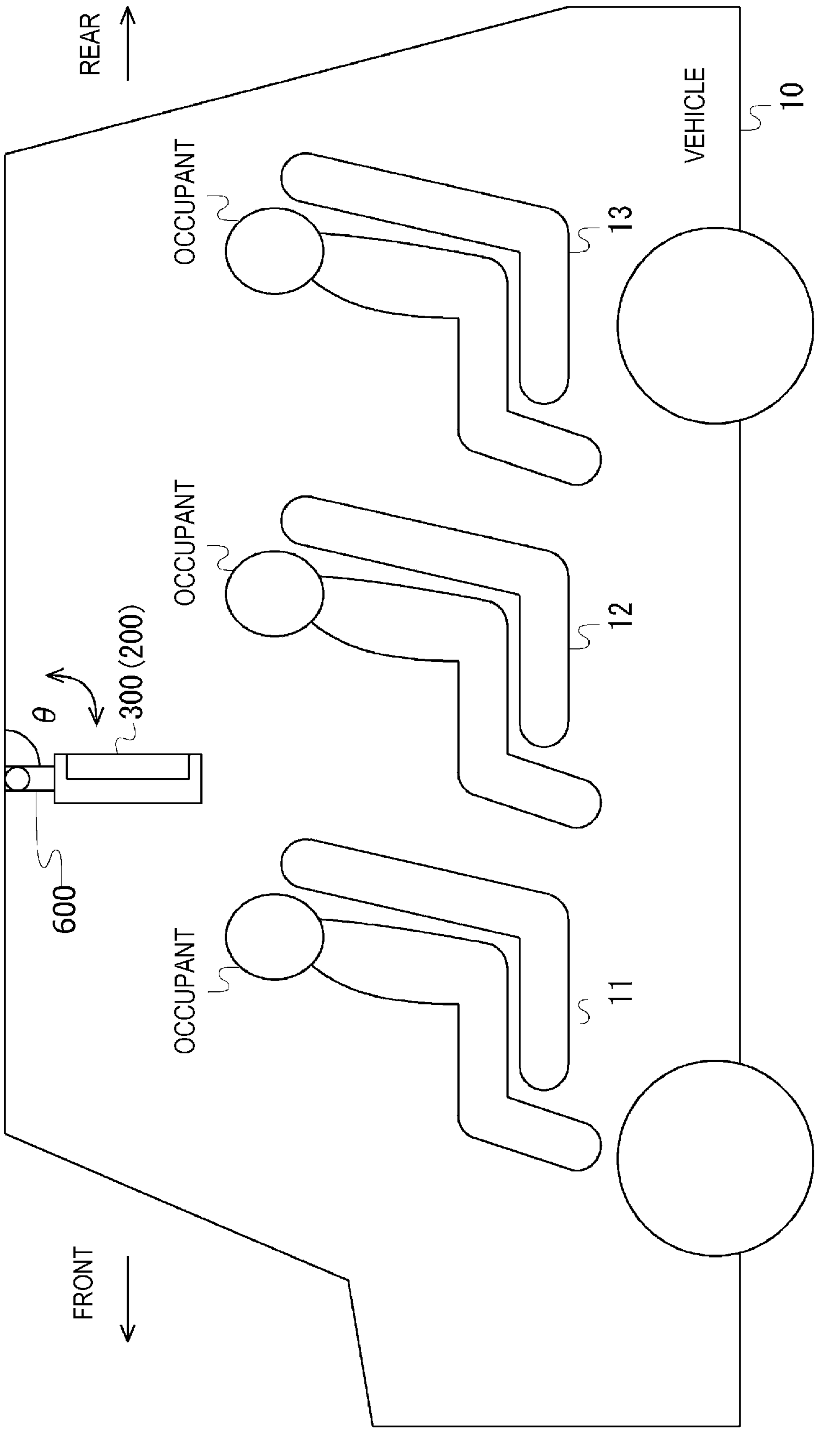
FIG. 2 is a diagram illustrating a first example of a panel speaker installed in a vehicle.

FIG. 2 is a diagram illustrating a first example of the panel speaker installed in the vehicle. FIG. 2 is a side view of a vehicle 10. A left side of the vehicle 10 in FIG. 2 indicates a front of the vehicle 10, and a right side indicates a rear of the vehicle 10. The panel speaker 300 (and the display device 200) is installed on a ceiling of the vehicle 10 via a connection portion 600. The panel speaker 300 is openably and closably attached by the connection portion 600. The connection portion 600 is connected to the ceiling of the vehicle 10 and the panel speaker 300. The connection portion 600 has a rotation axis parallel to an axle of the vehicle 10. The connection portion 600 can move a panel of the panel speaker 300 (the display screen of the display device 200) from a position (a storage position) substantially parallel to the ceiling of the vehicle 10 to a position slightly downward via a position orthogonal to a surface of the ceiling of the vehicle 10. When the panel of the panel speaker 300 (the display screen of the display device 200) is at the position (the storage position) substantially parallel to the ceiling of the vehicle 10, a surface of the panel (the display screen of the display device 200) faces upward.

The vehicle 10 includes, from the front, a first-row seat 11, a second-row seat 12, and a third-row seat 13, and an occupant can sit on each of the seats. Each of the first-row seat 11, the second-row seat 12, and the third-row seat 13 may include a plurality of seats. The panel speaker 300 is installed in a vicinity of the second-row seat 12. Here, the vicinity of the second-row seat 12 is in front of the second-row seat 12 and behind the first-row seat 11 (including a back surface of the first-row seat 11). The panel speaker 300 (and the display device 200) is installed at a position where occupants sitting on seats in second and subsequent rows of the vehicle 10 can view the display screen of the display device 200. Here, an angle (opening and closing angle) formed by the panel of the panel speaker 300 (the display screen of the display device 200) and the surface of the ceiling of the vehicle 10 is defined as θ. When the opening and closing angle θ is within a first range (for example, 90 degrees or more and less than 120 degrees), the occupant sitting on the second-row seat and the occupant sitting on the third-row seat can view the display screen of the display device 200. When the opening and closing angle θ is within a second range (for example, 120 degrees or more) different from the first range, the occupant sitting on the second-row seat can view the display screen of the display device 200, but it is difficult for the occupant sitting on the third-row seat to view the display screen of the display device 200. When the occupant sitting on the third-row seat does not view the display screen, the opening and closing angle θ is set to the second range, so that the occupant sitting on the second-row seat can more easily view the display screen of the display device 200. That is, when the occupant sitting on the third-row seat views the display screen of the display device 200, the opening and closing angle θ is set to the first range. Further, when the occupant sitting on the second-row seat views the display screen of the display device 200 but the occupant sitting on the third-row seat does not view the display screen of the display device 200, the opening and closing angle θ is set to the second range. In FIG. 2, the opening and closing angle θ is within the first range, and both the occupant sitting on the second-row seat and the occupant sitting on the third-row seat can view the display screen of the display device 200. When the panel of the panel speaker 300 (the display screen of the display device 200) is in the storage position, the opening and closing angle θ is substantially 0.

Figure 3:
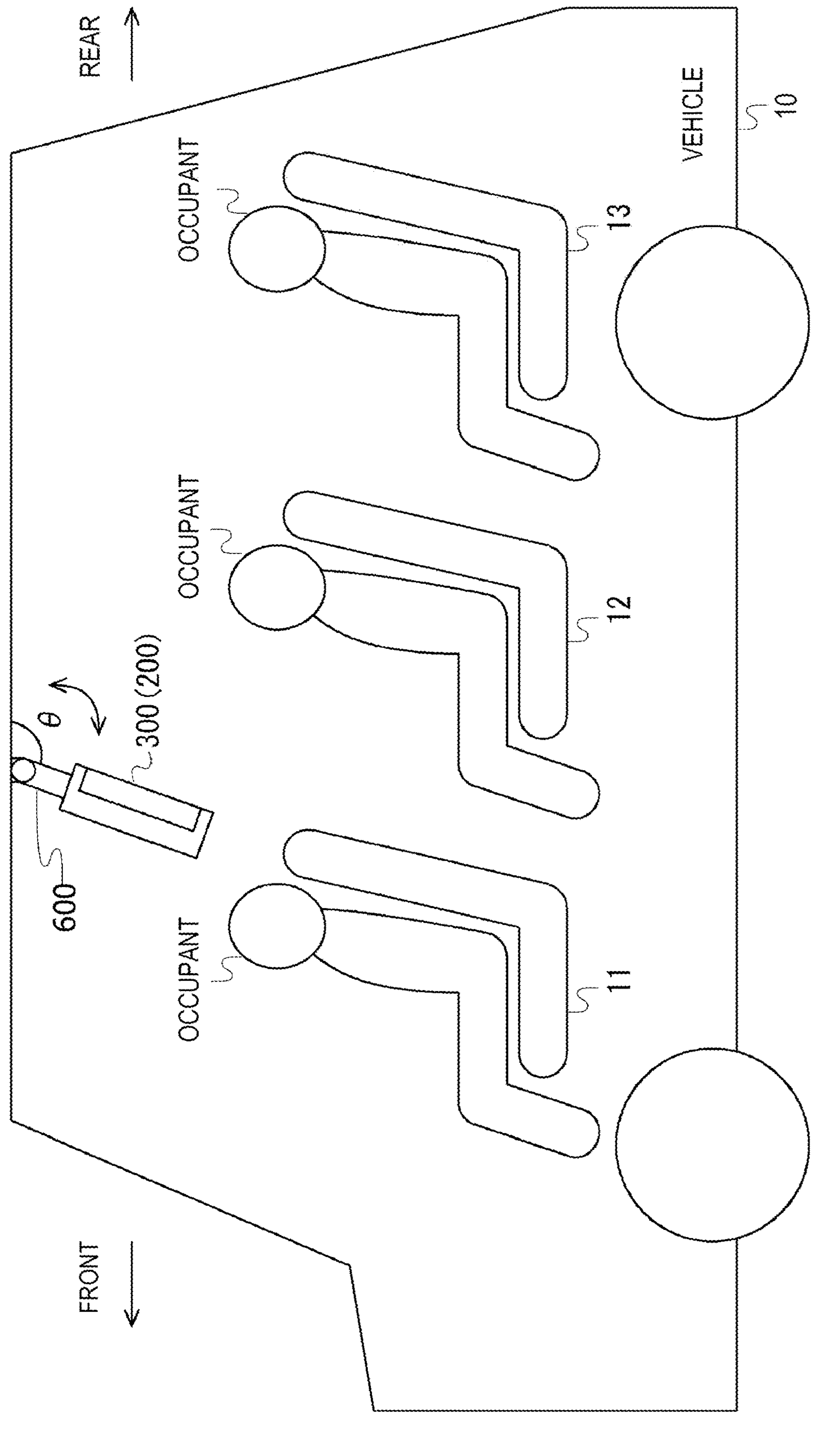
FIG. 3 is a diagram illustrating a second example of the panel speaker installed in the vehicle.

FIG. 3 is a diagram illustrating a second example of the panel speaker installed in the vehicle. FIG. 3 shows an example in which the opening and closing angle θ is set to the second range. In the example of FIG. 3, by setting the opening and closing angle θ to the second range larger than the first range, the occupant sitting on the second-row seat can more easily view the display screen of the display device 200. When the opening and closing angle θ is within the second range, it is not assumed that the occupant sitting on the third-row seat views the display screen of the display device 200. Here, when the opening and closing angle θ is within the second range, the occupant sitting on the third-row seat cannot view the display screen of the display device 200.

The sound device 100 acquires data of a content including sound information such as a video stored in a digital volatile disc (DVD) or the like, music stored in a compact disc (CD) or the like, television broadcasting, radio broadcasting, or the like, and outputs a video and a sound based on the data of the content from the display device 200 and the panel speaker 300. The sound information includes sound information of at least two channels (for example, a left channel and a right channel). The content includes, for example, a moving image such as a movie, a sound such as music played over a certain period of time.

The control unit 102 as a controller is a central processing unit that controls the entire sound device 100. The control unit 102 is also called a processor. However, the control unit 102 is not limited to a single processor, and may have a multi-processor configuration. Further, the single control unit 102 connected by a single socket may have a multi-core configuration. The control unit 102 loads a program stored in the storage unit 104 in a work area in an executable manner, and controls peripheral devices and the like through execution of the program, thereby providing a function matching a predetermined object. The control unit 102 may include a dedicated large scale integration (LSI) such as a digital signal processor (DSP), an application specific integrated circuit (ASIC), and a field-programmable gate array (FPGA), other digital circuits, or the like.

The storage unit 104 is a recording medium in which the control unit 102 stores the program and data, loads the work area, and stores operation setting information or the like. The storage unit 104 may store the data of the content or the like. The storage unit 104 is, for example, a flash memory, a random access memory (RAM), a read only memory (ROM), a hard-disk drive (HDD), a solid state drive (SSD), an erasable programmable ROM (EPROM), a flash memory, a USB memory, or a secure digital (SD) memory card. The storage unit 104 may be directly connected to the control unit 102.

The input and output IF 106 is an interface for inputting and outputting data to and from devices such as the display device 200, the panel speaker 300, and the input device 400. The input and output IF 106 is connected to the display device 200 such as a display that outputs a video, the panel speaker 300 that outputs a sound, the input device 400, or the like.

The communication IF 108 is a communication interface that communicates with the other information processing device or the like via the communication network or the like. The communication IF 108 is communicably connected to the vehicle control device 500 that controls an operation of the vehicle. The communication IF 108 may acquire the data of the content such as a video played by the sound device 100 from the other information processing device via the communication network.

A plurality of the above-described components may be provided, or some of the components may not be provided. Further, the above-described components may be included in the components of a device (for example, a car navigation system) mounted on the vehicle.

The display device 200 is a display having a display screen for displaying a video and character information. The display device 200 is, for example, a liquid crystal display (LCD), an organic electroluminescence (EL) panel, or a plasma display panel (PDP). The display device 200 is communicably connected to the sound device 100. A plurality of display devices 200 may be installed in the vehicle. The display device 200 may play (output) a video (image) under the control of the control unit 102.

The panel speaker 300 is a speaker that outputs sound such as music and voice. The panel speaker 300 is, for example, a speaker that outputs the sound by vibrating a planar panel such as a display panel. Here, the panel speaker 300 outputs (emits) the sound (sound wave) when a vibration actuator connected to the display screen of the display device 200 vibrates the display screen (vibration panel). The panel speaker 300 includes at least two vibration actuators. Each vibration actuator is disposed on a panel serving as a diaphragm (vibration panel). The vibration actuators may be independently controlled. By independently controlling the vibration actuators, sound may be output by a plurality of channels (for example, the left channel and the right channel). For example, when the panel speaker 300 includes two vibration actuators, one vibration actuator corresponds to the left channel, and the other vibration actuator corresponds to the right channel. The display device 200 and the panel speakers 300 may be installed at a rear portion of the first-row seat 11. The panel speaker 300 may output the sound under the control of the control unit 102. The left channel and the right channel are examples of a first channel and a second channel, respectively.

The input device 400 is, for example, a device that inputs information when a user operates the sound device 100. The input device 400 is a keyboard, a remote controller, a pointing device, a touch panel, or the like. The touch panel as the input device 400 may be provided on the display screen of the display device 200. The input device 400 and the communication IF 108 of the sound device 100 may be communicably connected to each other in a wired manner or in a wireless manner (by radio waves, infrared rays, or the like).

The display device 200, the panel speaker 300, and the input device 400 are devices for enjoying television broadcasting, a DVD video, or the like on the seats in the second and subsequent rows in a vehicle interior of the vehicle 10, and are devices for a so-called rear seat entertainment (RSE) system.

The vehicle control device 500 is a device that controls traveling of the vehicle on which the sound device 100 or the like is mounted. In response to a request from the sound device 100, the vehicle control device 500 outputs, to the sound device 100, information such as a traveling state of the vehicle 10 (such as a traveling speed of the vehicle 10), whether an occupant is sitting on each seat, and the opening and closing angle of the panel speaker 300 installed in the vehicle 10. The vehicle control device 500 can acquire information on the speed (traveling speed) of the vehicle 10 from a sensor or the like in the vehicle 10 by existing means. The vehicle control device 500 can acquire information on whether an occupant is sitting on each seat, for example, from a weight sensor or the like installed in each seat. The vehicle control device 500 may acquire the opening and closing angle θ of the panel speaker 300 from a sensor or the like that detects the opening and closing angle θ of the panel speaker 300.

(Operation Example)

Figure 4:
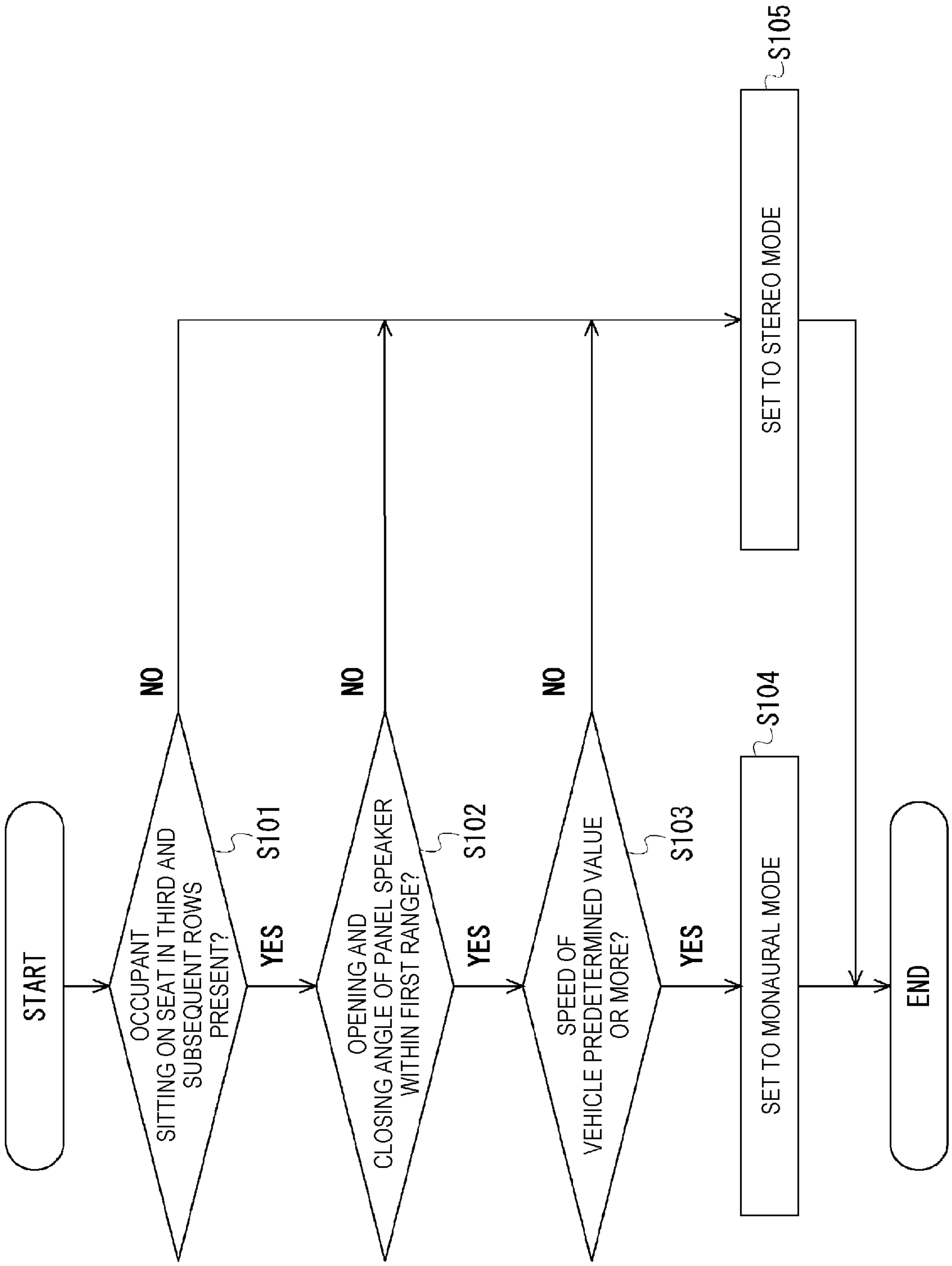
FIG. 4 is a diagram illustrating an example of an operation flow of a sound device 100.

FIG. 4 is a diagram illustrating an example of an operation flow of the sound device 100. Here, it is assumed that the control unit 102 of the sound device 100 reads data of the content such as a video stored in the storage unit 104 and plays one piece of the content (for example, a video such as a movie) using the display device 200 and the panel speaker 300. It is assumed that the content includes the sound information of the two channels (the left channel and the right channel). The content may include sound information of three or more channels (for example, a total of five channels including a left channel, a right channel, a central channel, a right rear channel, a left rear channel, and a subwoofer channel). Further, the sound information of each channel may not necessarily correspond to the right channel/the left channel of stereo. For example, the sound information may correspond to a vocal of a music and a part of each musical instrument, or may correspond to an announcement and back ground music (BGM). Further, when the content includes a video, the content may be associated with sound information (a speech of a person, an engine sound of a vehicle, an explosion sound of a flight machine or a helicopter, a sound of an animal, or the like) associated with each object included in the video. The control unit 102 may acquire content data from another information processing device or the like via the communication IF 108 and the communication network. The operation flow of FIG. 3 is executed, for example, at predetermined time intervals (for example, five seconds, one minute, ten minutes, or the like).

In S101, the control unit 102 of the sound device 100 determines whether an occupant sitting on the third-row seat 13 of the vehicle 10 is present. In a case where no occupant sitting on the third-row seat 13 of the vehicle 10 is present, sound for the occupant on the third-row seat 13 may not be considered. Whether an occupant sitting on a seat of the vehicle 10 is present is an example of a seating state of the vehicle 10.

The control unit 102 requests, via the communication IF 108, the vehicle control device 500 to provide information for determining whether an occupant sitting on the third-row seat 13 of the vehicle 10 is present. The information for determining whether an occupant sitting on the third-row seat 13 of the vehicle 10 is present is information on a weight indicated by the weight sensor installed on the third-row seat. The weight sensor is installed on a seating surface of the third-row seat and measures the weight applied to the seating surface. Here, it is assumed that the information for determining whether an occupant sitting on the third-row seat 13 of the vehicle 10 is present is information on the weight. When the vehicle control device 500 receives the request from the sound device 100, the weight applied to the seating surface of the third-row seat is measured by the weight sensor. The vehicle control device 500 transmits information on the measured weight to the sound device 100. The control unit 102 of the sound device 100 acquires the information on the weight from the vehicle control device 500 via the communication IF 108.

When the weight is a predetermined value (for example, 15 kg) or more, the control unit 102 determines that an occupant sitting on the third-row seat 13 is present. When the weight is less than the predetermined value (for example, 15 kg), the control unit 102 determines that no occupant sitting on the third-row seat 13 is present. At this time, it is considered that nothing, or an object that is not an occupant, or the like is placed on the third-row seat 13. When it is determined that an occupant sitting on the third-row seat 13 is present (S101, YES), the process proceeds to S103. When it is determined that no occupant sitting on the third-row seat 13 is present (S101, NO), the process proceeds to S105.

The information for determining whether an occupant sitting on the third-row seat 13 of the vehicle 10 is present is not limited to the information indicated by the weight sensor, and may be, for example, information indicating a mounting state of a seat belt mounted on the third-row seat 13. When the information indicates that the seat belt is mounted, the control unit 102 can determine that the occupant sitting on the third-row seat 13 is present. Further, the information for determining whether an occupant sitting on the third-row seat 13 of the vehicle 10 is present may be, for example, information obtained by analyzing a video captured by a camera installed in the vehicle interior. When information indicating that a person is present at the position of the third-row seat 13 is obtained as a result of analyzing the video of the camera by a method such as pattern matching, the control unit 102 can determine that an occupant sitting on the third-row seat 13 is present.

In S102, the control unit 102 of the sound device 100 determines whether the opening and closing angle θ of the panel speaker 300 is within the first range in which the occupant sitting on the third-row seat 13 can view the display screen of the display device 200. When the opening and closing angle θ is within the first range, it is considered that the occupant sitting on the third-row seat 13 is viewing the display screen of the display device 200. That is, it is considered that the occupant sitting on the third-row seat 13 is listening to the sound output from the panel speaker 300. Accordingly, the sound device 100 is required to consider the sound for the occupant sitting on the third-row seat 13. When the opening and closing angle θ is within the second range, it is considered that the occupant sitting on the third-row seat 13 is not viewing the display screen of the display device 200. Accordingly, the sound device 100 may not consider the sound for the occupant sitting on the third-row seat 13.

The control unit 102 requests, via the communication IF 108, the vehicle control device 500 to provide information on the opening and closing angle θ of the panel speaker 300. When the vehicle control device 500 receives the request from the sound device 100, the opening and closing angle θ of the panel speaker 300 is measured by the sensor that measures the opening and closing angle θ. The vehicle control device 500 transmits the information on the measured opening and closing angle θ to the sound device 100. The control unit 102 of the sound device 100 acquires the information on the opening and closing angle θ from the vehicle control device 500 via the communication IF 108.

When the opening and closing angle θ is within the first range (for example, 90 degrees or more and less than 120 degrees) (S102, YES), the process proceeds to S103. When the opening and closing angle θ is not within the first range (for example, 90 degrees or more and less than 120 degrees) (S102, NO), the control unit 102 proceeds to S105. Here, when the opening and closing angle θ is not within the first range (for example, 90 degrees or more and less than 120 degrees), the opening and closing angle θ is within the second range (for example, 120 degrees or more).

In S103, the control unit 102 of the sound device 100 determines whether the speed (traveling speed) of the vehicle 10 is equal to or larger than a predetermined value. When the speed of the vehicle 10 is equal to or larger than the predetermined value, it is considered that noise in the vehicle interior of the vehicle 10 is large. Therefore, it is required to consider the sound for the occupant on the third-row seat.

The control unit 102 requests, via the communication IF 108, the vehicle control device 500 to provide the information on the speed (traveling speed) of the vehicle 10. When receiving the request from the sound device 100, the vehicle control device 500 acquires the information on the speed of the vehicle 10. The vehicle control device 500 transmits the acquired information on the speed of the vehicle 10 to the sound device 100. The control unit 102 of the sound device 100 acquires the information on the speed of the vehicle 10 from the vehicle control device 500 via the communication IF 108.

When the speed of the vehicle 10 is the predetermined value (for example, 30 km/h) or more (S103, YES), the process proceeds to S104. When the speed of the vehicle 10 is less than the predetermined value (for example, 30 km/h) (S103, NO), the process proceeds to S105. In view of an increase in the noise in the vehicle 10 when the vehicle 10 is traveling, the control unit 102 may set the predetermined value to, for example, 0 km/h.

In S104, the control unit 102 sets sound output from the panel speaker 300 to a monaural mode. That is, the control unit 102 generates monaural sound information obtained by adding and integrating the sound information (sound signal) of the left channel and the sound information (sound signal) of the right channel among the sound information (sound signal) output from the panel speaker 300. The control unit 102 outputs the monaural sound information to the vibration actuator corresponding to the left channel of the panel speaker 300 and the vibration actuator corresponding to the right channel of the panel speaker 300. The panel speaker 300 vibrates the vibration actuator corresponding to the left channel and the vibration actuator corresponding to the right channel of the panel speaker 300 based on the monaural sound information to output the sound based on the monaural sound information. The monaural mode is a mode in which sound based on monaural sound information in which sound information of the left channel and sound information of the right channel are added is output. Accordingly, sound (monaural sound) having a higher sound pressure than sound in a stereo mode to be described later is output. Specifically, when a single panel is vibrated by a plurality of vibration actuators that vibrate with the same signal, the vibration is further strengthened, and the sound having the higher sound pressure can be output.

The sound output in the monaural mode is not limited to the sound based on the monaural sound information obtained by adding the sound information of the left channel and the sound information of the right channel. For example, both the vibration actuator corresponding to the left channel and the vibration actuator corresponding to the right channel may be vibrated based on sound information of either the left channel or the right channel. Further, when the content includes sound information (for example, a center channel, vocal, announcement, BGM, or the like) of a channel other than the left channel and the right channel, the vibration actuator may be vibrated based on the sound information of the other channel.

The monaural mode according to the embodiment is a mode in which the plurality of vibration actuators provided in the panel speaker 300 are vibrated based on the same sound information.

In S105, the control unit 102 sets the sound output from the panel speaker 300 to the stereo mode. That is, the control unit 102 outputs the sound information (sound signal) of the left channel of the sound information (sound signal) output from the panel speaker 300 to the vibration actuator corresponding to the left channel of the panel speaker 300. The control unit 102 outputs the sound information (sound signal) of the right channel of the sound information (sound signal) output from the panel speaker 300 to the vibration actuator corresponding to the right channel of the panel speaker 300. The panel speaker 300 vibrates the vibration actuator corresponding to the left channel based on the sound information of the left channel to output sound based on the left channel. Further, the panel speaker 300 vibrates the vibration actuator corresponding to the right channel based on the sound information of the right channel to output sound based on the right channel. Accordingly, sound (stereo sound) with realistic sensation is output. The stereo mode is a mode in which the sound based on the sound information of the left channel and the sound based on the sound information of the right channel are independently controlled and output.

In the stereo mode, sound of three channels or more may be output. For example, in a case where the panel speaker 300 includes three vibration actuators at the left and right and at the center, in addition to the right channel and the left channel described above, the panel speaker 300 may vibrate a central actuator by the sound information of the central channel to output sound based on the central channel. Further, for example, the central actuator may be vibrated based on the sound information of the vocal of the musical piece, and the left and right actuators may be vibrated based on the sound information of the parts of each musical instrument. Further, for example, the central actuator may be vibrated based on the sound information of the announcement, and the left and right actuators may be vibrated based on the sound information of the BGM.

In a case where the content includes a video and the panel speaker 300 also serves as a display panel, an actuator provided at a position close to a display position of an object included in the image displayed on the display panel may be vibrated based on sound information associated with the object (speech of a person, an engine sound of a vehicle, an explosion sound of an airplane or a helicopter, a sound of an animal, or the like) to output sound associated with the object from the display position of the object.

In short, the stereo mode in the embodiment is a mode in which the plurality of actuators provided in the panel speaker 300 are vibrated based on different sound information.

The order of steps S101 to S103 may be changed. Any one or two of the steps from S101 to S103 may be omitted.

For example, when step S103 is performed for the first time, the sound mode can be changed based on the speed of the vehicle 10 regardless of the presence or absence of an occupant sitting on the third-row seat. In this case, when the speed of the vehicle 10 is equal to or larger than the predetermined value (that is, when the noise in the vehicle 10 is large), the sound from the panel speaker 300 can be easily heard regardless of the presence or absence of an occupant sitting on the third-row seat.

For example, when step S102 is performed for the first time, the sound mode can be changed based on the opening and closing angle θ of the panel speaker 300 without detecting the presence or absence of an occupant sitting on the third-row seat. When the opening and closing angle θ is within the first range (for example, 90 degrees or more and less than 120 degrees), it is considered that the occupant sitting on the third-row seat 13 is likely to view the display screen of the display device 200, that is, the occupant sitting on the third-row seat 13 is likely to hear the sound output from the panel speaker 300, the sound from the panel speaker 300 can be easily heard by changing the sound mode. Accordingly, the sound mode can be changed to an appropriate sound mode according to the presence or absence of the occupant sitting on the third-row seat without separately providing a means for detecting the presence or absence of the occupant sitting on the third-row seat.

A timing at which the control unit 102 changes the sound mode may be changed immediately when the seating state or the opening and closing angle θ is changed, or may be changed at another timing. For example, the change may be performed only once at a timing at which the occupant can get into the vehicle and travel (in other words, at a timing at which the sound device 100 is powered on), and then the change may not be performed during use of the vehicle (in other words, while the sound device 100 is powered on). Further, after the speed of the vehicle becomes equal to or larger than a first predetermined value (for example, 10 km/h), the change may be performed at a timing when the speed of the vehicle becomes equal to or lower than a second predetermined value (for example, 5 km/h). The second predetermined value is less than the first predetermined value. Further, the control unit 102 may monitor opening and closing of a door of the vehicle and change the sound mode when the door of the vehicle is opened or closed. In this way, it is possible to prevent the occupant from feeling uncomfortable due to excessively frequent change of the sound mode.

Instead of steps S101 to S103, the control unit 102 may cause the occupant in the vehicle 10 to input the sound mode (monaural mode or stereo mode) to be adopted via the input device 400. The control unit 102 outputs the sound (S104 or S105) based on the input sound mode. Accordingly, the sound can be output in a sound mode desired by the occupant in the vehicle 10. Further, the control unit 102 may determine the sound mode to be adopted based on other conditions different from S101 to S103.

(Modification)

In the above-described example, an example in which the panel speaker 300 is installed in the vicinity of the second-row seat 12 is described. In the modification, an example in which the panel speaker 300 is installed in the vicinity (front) of the first-row seat 11 will be described. Here, differences from the above-described example will be mainly described. Here, the sound device 100 considers the sound for occupants on the second-row seat 12 and the third-row seat 13.

Figure 5:
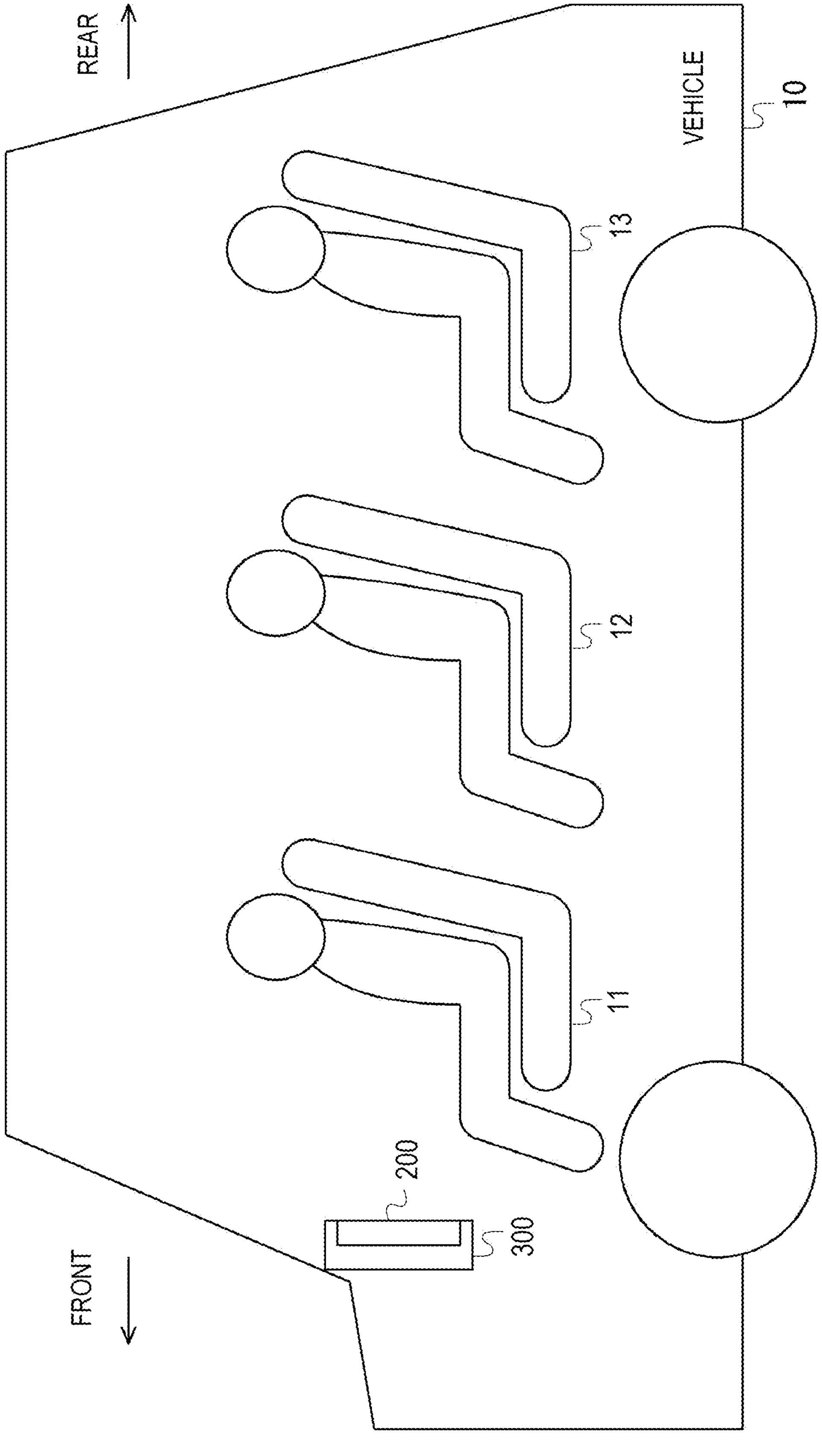
FIG. 5 is a diagram illustrating an example of a panel speaker installed in a vehicle according to a modification.

FIG. 5 is a diagram illustrating an example of the panel speaker installed in the vehicle according to the modification. In the example of FIG. 5, the display device 200 and the panel speaker 300 are provided in front of the first-row seat (for example, a dashboard) of the vehicle 10. In the first modification, in S101, the control unit 102 of the sound device 100 determines whether occupants sitting on the second-row seat 12 and the third-row seat 13 of the vehicle 10 are present. In a case where no occupant sitting on the second-row seat 12 and the third-row seat 13 of the vehicle 10 is present, it may not be necessary to consider the sound for the occupants on the second-row seat 12 and the third-row seat 13. Further, the control unit 102 requests the vehicle control device 500 to provide information for determining whether occupants sitting on the second-row seat 12 and the third-row seat 13 of the vehicle 10 are present. The information for determining whether an occupant sitting on the second-row seat 12 of the vehicle 10 can be acquired in the same manner as the information for determining whether an occupant sitting on the third-row seat 13 is present.

The vehicle 10 may be a vehicle having two rows (front and rear rows) of seats instead of the vehicle having three or more rows of seats. The vehicle having two rows of seats is also an example of a vehicle having a plurality of rows of seats.

In the modification, the panel speaker 300 may be capable of changing the angle at which the panel faces by a tilt mechanism or the like, and the monaural mode and the stereo mode may be selected according to the angle. For example, in a horizontal state in which a panel surface faces upward (a state in which a normal direction of the panel is vertical), the angle of the panel is 0 degree, in a vertical state in which the panel surface faces rearward of the vehicle (a state in which the normal direction of the panel is horizontal), the angle of the panel is 90 degrees, and the stereo mode may be selected when the angle of the panel is within a third range (for example, 45 degrees or more and less than 70 degrees) and the monaural mode may be selected when the angle of the panel is within a fourth range (for example, 70 degrees or more). When the angle of the panel is within the third range (for example, 45 degrees or more and less than 70 degrees), the normal direction of the panel is oriented obliquely, and the angle of the panel is an angle at which the occupant sitting on the first-row seat 11 of the vehicle easily views the display screen, and conversely, an angle at which it is difficult for occupants sitting on the second-row seat 12 and the third-row seat 13 to view the display screen. In this case, it is possible to select the stereo mode without considering occupants in the second row and the third row, and to output stereo sound to an occupant sitting on the first-row seat 11. When the angle of the panel is within the fourth range (for example, 70 degrees or more), the normal direction of the panel is close to horizontal, and the angle of the panel is an angle at which occupants sitting on the second-row seat 12 and the third-row seat 13 can easily view the display screen. In this case, the monaural mode can be selected in consideration of the occupants in the second row and the third row, and the sound that can be easily heard by the occupants in the second row and the third row can be output.

(Another Modification)

In another modification, the stereo mode may be selected when the panel speaker 300 is installed on a ceiling and in a state where the panel surface is substantially parallel to the ceiling. Specifically, assuming that the angle of the panel is 0 degree in a horizontal state in which a panel surface faces upward (a state in which a normal direction of the panel is vertical) and the angle of the panel is 90 degrees in a vertical state in which the panel surface faces forward or rearward of the vehicle (a state in which the normal direction of the panel is horizontal), the stereo mode may be selected when the angle of the panel is within a fifth range (for example, less than 10 degrees). Here, the angle of the panel means an angle between the ceiling surface on which the panel speaker 300 is installed and the panel surface of the panel speaker 300 or may mean an angle between the normal direction of the ceiling surface and the normal direction of the panel surface. The angle of the panel has the same meaning as the opening and closing angle θ explained in the aforementioned embodiment and FIGS. 2 and 3.

When the angle of the panel is within the fifth range (for example, less than 10 degrees), the panel speaker 300 is in a state where the panel surface is housed in parallel to the ceiling surface. In this case, the panel surface may face either upward (that is, face the ceiling surface) or downward (that is, turn away from the ceiling surface).

When the angle of the panel is within the fifth range (for example, less than 10 degrees), the panel is hardly viewable from any positions on the seat in the vehicle, and therefore it may be preferable not to display any contents on the display screen of the display device 200. In such a case, the panel speaker 300 may simply function as a stereo speaker according to this modification.

With the panel speaker 300 functioning as a stereo speaker when the panel is housed in the ceiling surface of the vehicle, stereo sound may be output from the ceiling of the vehicle as well as from speakers provided on doors of the vehicle, which may provide the occupants with feelings as if they heard the sound in a wide listening room.

In a case of outputting the stereo sound, a known processing to add a reverberant sound (typically reverberation processing) may be performed on the stereo sound to be output to provide the occupants with feelings as if they heard the sound in wider space like a hall.

Further, in the modification, the monaural mode may be selected when the angle of the panel is within a sixth range (for example, 10 degrees or more). When the angle of the panel is within the sixth range (for example, 10 degrees or more), the panel speaker 300 is in a state in which the panel is raised from the ceiling surface.

In this state, the occupants in the vehicle can watch the content displayed on the display device 200. By displaying the video included in the contents on the display screen of the display device 200 and outputting the sound included in the contents, the occupants can watch and listen to the contents in which the video and the sound are united.

The monaural mode may be selected in this state to output, from the panel speaker 300, sound having higher sound pressure, which may provide the occupants with improved sense of unity of the video and the sound.

Here the fifth range and the sixth range are not necessarily consecutive. For example, the sixth range may be 45 degrees or more. In this case, when the angle of the panel is between the fifth range and the sixth range, that is, 10 degrees or more and less than 45 degrees, either the stereo mode or the monaural mode may be selected, or none of them may be selected not to output sound.

(Operation)

The sound device 100 causes the panel speaker 300 including the plurality of vibration actuators to output the sound. The sound device 100 determines (selects) the sound mode of the panel speaker 300 based on the presence or absence of an occupant sitting on the third-row seat 13 (sitting situation), the opening and closing angle θ of the panel speaker 300, and the speed (traveling speed) of the vehicle 10. The sound device 100 determines the sound mode such that an occupant sitting on the third-row seat 13 (an occupant sitting on the seat away from the panel speaker 300) can easily hear the sound. The sound device 100 performs monaural play by the plurality of actuators of the panel speaker 300, so that the sound pressure can be increased as compared with the case of stereo play, and the sound can be delivered to the occupant sitting on the third-row seat at a sufficient volume. Further, when no occupant sitting on the third-row seat is present, the sound device 100 can deliver the sound with more realistic sensation for the stereo play to the occupant sitting on the second-row seat.

The configuration of the disclosure is not limited to the above-described embodiment, and various modifications are possible. The above-described embodiment may be appropriately combined as much as possible.

<Computer Readable Recording Medium>

A program that causes a machine or device other than a computer (hereinafter, referred to as a computer or the like) to implement any of the functions described above can be recorded in a computer-readable recording medium. The functions can be provided by causing a computer or the like to read and execute the program from the recording medium.

Here, the recording medium readable by the computer or the like refers to a recording medium capable of accumulating information such as data or a program by an electrical, magnetic, optical, mechanical, or chemical action and reading the information from the computer or the like. Examples of such a recording medium that can be removed from the computer or the like include a flexible disk, a magneto-optical disk, a CD-ROM, a CD-R/W, a DVD, a Blu-ray disk, a DAT, a 8 mm tape, and a memory card such as a flash memory. The recording medium fixed to the computer or the like may be a hard disk, a read only memory (ROM), or the like. Further, a solid state drive (SSD) may be used as a recording medium removable from the computer or the like, or as a recording medium fixed to the computer or the like.

What is claimed is:

1. A sound device for controlling a panel speaker configured to output sound by vibrating a single panel with a plurality of vibration actuators, the sound device comprising:

a controller configured to select a stereo mode, in which each of the plurality of vibration actuators is vibrated by a sound signal of each channel included in a content, and a monaural mode, in which the plurality of vibration actuators are vibrated by a same sound signal, wherein the panel speaker is installed on a ceiling of a vehicle such that an angle between the single panel of the panel speaker and a surface of the ceiling is adjustable, the controller selects the stereo mode in response to the angle being less than a first angle, and the controller selects the monaural mode in response to the angle being a second angle that is equal to or greater than the first angle.

2. The sound device according to claim 1, wherein the controller selects the stereo mode or the monaural mode according to a speed of the vehicle.

3. The sound device according to claim 1, wherein the controller selects the stereo mode or the monaural mode (i) at a timing when the sound device is powered on, (ii) at a timing when a speed of the vehicle is equal to or larger than a first predetermined value and then is equal to or lower than a second predetermined value, or (iii) at a timing when a door of the vehicle is opened or closed.

4. A control method executed by a controller configured to control a panel speaker configured to output sound by vibrating a single panel with a plurality of vibration actuators, the control method comprising:

selecting a stereo mode, in which each of the plurality of vibration actuators is vibrated by a sound signal of each channel included in a content, and a monaural mode, in which the plurality of vibration actuators are vibrated by a same sound signal, wherein the panel speaker is installed on a ceiling of a vehicle such that an angle between the single panel of the panel speaker and a surface of the ceiling is adjustable, the selecting of the stereo mode is performed in response to the angle being less than a first angle, and the selecting of the monaural mode is performed in response to the angle being a second angle that is equal to or greater than the first angle.

5. A sound device for controlling a panel speaker configured to output sound by vibrating a single panel with a plurality of vibration actuators, the sound device comprising:

a controller configured to select a stereo mode, in which each of the plurality of vibration actuators is vibrated by a sound signal of each channel included in a content, and a monaural mode, in which the plurality of vibration actuators are vibrated by a same sound signal, wherein the panel speaker is installed in a vehicle, the controller selects the stereo mode or the monaural mode based on a seating state of a seat provided in the vehicle, and the controller selects the stereo mode or the monaural mode (i) at a timing when the sound device is powered on, (ii) at a timing when a speed of the vehicle is equal to or larger than a first predetermined value and then is equal to or lower than a second predetermined value, or (iii) at a timing when a door of the vehicle is opened or closed.

6. The sound device according to claim 5, wherein a plurality of rows of seats is provided in the vehicle, and the controller selects the stereo mode or the monaural mode based on a seating state of each row of the plurality of rows of seats.

7. The sound device according to claim 5, wherein a first-row seat, a second-row seat, and a third-row seat are provided in the vehicle in order from a front-side of the vehicle, the panel speaker is installed in a vicinity of the second-row seat, and the controller selects the monaural mode in response to a presence of an occupant sitting on the third-row seat.

8. The sound device according to claim 5, wherein a first-row seat, a second-row seat, and a third-row seat are provided in the vehicle in order from a front-side of the vehicle, the panel speaker is installed in a vicinity of the second-row seat, and the controller selects the stereo mode in response to a presence of an occupant sitting on the second-row seat and an absence of an occupant sitting on the third-row seat.

9. The sound device according to claim 5, wherein a first-row seat, a second-row seat, and at least one subsequent row seat are provided in the vehicle in order from a front-side of the vehicle, the panel speaker is installed in front of the first-row seat, and the controller selects the monaural mode in response to a presence of an occupant sitting on the second-row seat or the at least one subsequent row seat.

10. The sound device according to claim 5, wherein a first-row seat, a second-row seat, and at least one subsequent row seat are provided in the vehicle in order from a front-side of the vehicle, the panel speaker is installed in front of the first-row seat, and the controller selects the stereo mode in response to a presence of an occupant sitting on the first-row seat and an absence of an occupant sitting on the second-row seat or the at least one subsequent row seat.

11. The sound device according to claim 5, wherein the controller selects the stereo mode or the monaural mode according to a speed of the vehicle.

12. The sound device according to claim 11, wherein the controller selects the monaural mode when the speed of the vehicle is equal to or larger than a predetermined value.

* * * * *